Dec. 9, 1958     G. E. W. LEWIN     2,863,690
FITTINGS FOR COUPLED WINDOWS
Filed Sept. 6, 1956
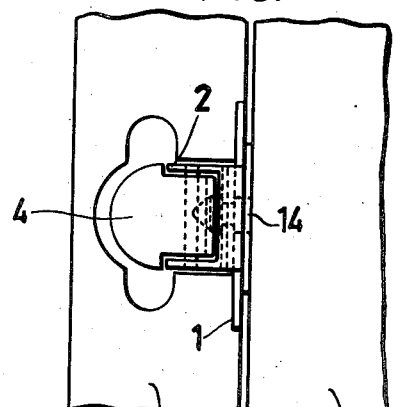
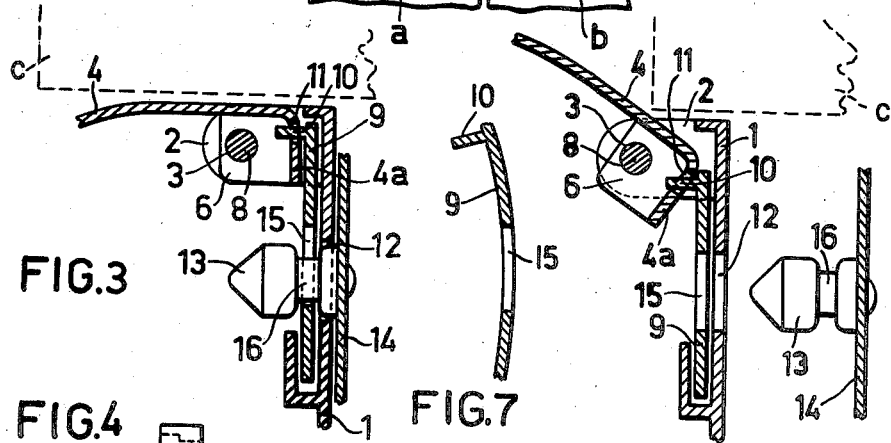
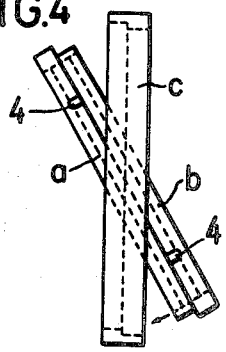
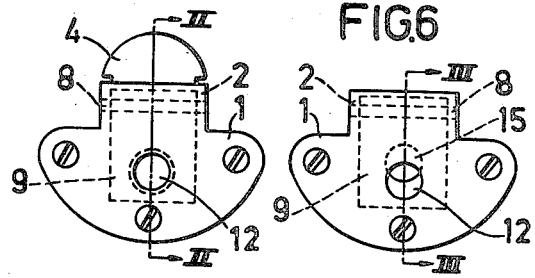
INVENTOR.
Gunnar E. W. Lewin
BY Darby & Darby

United States Patent Office 2,863,690
Patented Dec. 9, 1958

2,863,690

FITTINGS FOR COUPLED WINDOWS

Gunnar Eric Werner Lewin, Viggebyholm, Sweden, assignor to Aktiebolaget Atvidabergs Butiksingredningar, Stockholm, Sweden, a company of Sweden Application September 6, 1956, Serial No. 608,299

Claims priority, application Sweden November 4, 1955

5 Claims. (Cl. 292—302)

The present invention relates to a fitting for coupled windows and the like, of the kind consisting of two portions each to be fixed to one of two window sash which are to be coupled together; one portion of the fitting including a pin having a transverse groove and the other portion of the fitting including relatively slidable plates having holes therein such that the pin may be inserted in the holes when they are in alignment and will be retained therein when one of the plates is moved relative to the other. The invention is substantially characterized in that a double-armed lever is turnably fixed to that part of the fitting that is provided with the locking plate, and that the locking plate is provided with a projection which engages a recess in one arm of the lever, so that the locking plate can be moved to and fro through the action of a second arm, the actuating arm, of the lever, the two holes communicating completely with each other, when the locking plate is in the unlocked position, and, in the locked position, when the said actuating arm is substantially at right angles to the locking plate, the said holes are so disposed in relation to each other that the pin is locked in the holes the locking plate being inserted in the said transverse pin groove. The locking plate can be resilient and that portion that is provided with the said projection may be bent towards the moving arm, and the axis of oscillation of the lever may be located in a horizontal plane between the two end positions of the projection, so that the locking plate, due to the action of the spring force of the locking plate, will tend to be moved to one of its two end positions.

According to the invention the fitting portion with the lever may be adapted to be fixed so that, the actuating arm extends away from the closed position of the sash. Thus, if the fitting is not locked when the window is shut, the actuating arm will strike against the window sill, whereby the actuating arm is swung down towards its sash and the fitting is locked.

By the fitting according to the invention the advantage is inter alia obtained that it is locked automatically if it is not locked when the window is shut. Besides, the fitting is not susceptible to rust or corrosion, partly because the resilient locking plate is well hidden behind the fitting, and partly because the said actuating arm is long in relation to the small motion imparted to the locking plate by the other arm. Due to the fact that the said locking plate is in the form of a bow-shaped spring and due to the manner in which it is placed on the lever, the actuating arm is retained in either the locked or unlocked position once assumed.

An embodiment of the fitting according to the invention is shown in the accompanying drawing, Fig. 1 shows two window sashes viewed from the edges thereof coupled together by means of the fitting. Fig. 2 shows on an enlarged scale a section through the fitting in unlocked position along the line II—II in Fig. 5, the two fitting portions being separated, and Fig. 3 shows a section through the fitting in locked position along the line III—III in Fig. 6. Fig. 4 shows a pivotally mounted window, two fittings being mounted on each sash. Fig. 5 shows one fitting portion in unlocked position seen from the right in Fig. 2, and Fig. 6 in locked position seen from the right in Fig. 3. Fig. 7 shows the form of the bowed locking plate (also shown in Figs. 2 and 3) in its unstressed condition before assembly in the latch mechanism.

Referring now to the drawings 1 denotes a fitting portion, which is inserted in the sash $a$ and provided with two ears 2 in which holes 3 are made. One arm, the actuating arm 4, of a double-armed lever is provided with two corresponding ears 6 and holes corresponding to the holes in the fitting 1, and the lever is pivoted on a shaft 8 going through the holes and fixed in the holes 3. Behind the fitting 1 a resilient bow-shaped locking plate 9 is displaceably arranged, which at its upper edge is provided with a projection 10 which fits in an indentation 11 in the second arm, 4a, of the lever. The shape of the bowed locking plate will be readily apparent from Fig. 7 of the drawings which shows plate 9 in its unstressed condition, and it will be understood that the plate 9 may be bowed to any desired extent so that the end of the plate having the projection 11 is urged to the left (in Figs. 2 and 3) thereby bearing against the lever arm 4a. Thus the lever 4 is urged to its extreme positions, and when placed in either the locked or the unlocked position, the lever 4 will tend to remain in that position. In the fitting 1 a hole 12 is provided adapted to receive a pin 13 provided on the second fitting portion 14 which is attached to the window sash $b$. The locking plate 9 is provided with a hole 15 which, when the actuating arm 4 is moved upwards, is in alignment with the hole 12 in the fitting portion 1, owing to the fact that the moving arm 4a actuates the projection 11. The pin 13 of the fitting portion 14 is provided with an annular groove 16 which the lower part of the edge of the hole 15 in the locking plate engages, when the latter is moved upwards by depressing the actuating arm 4.

When the sashes $a$ and $b$ are to be disconnected in order to clean the glasses or the like, the actuating arm 4 is moved upwards, relative to the edge of the window sash $a$ (Fig. 2). Then the actuating arm 4a actuates the projection 10 on the locking plate 9, whereby the latter is moved downwards, and the lower edge portion of the hole 15 of the locking plate 9 is released from the groove 16 of the pin 13, whereby the pin 13 can be moved from the fitting portion 1 and the sashes can be moved from each other. When the sashes are connected, they are moved toward each other so that the pin 13 of the fitting portion 14 of the sash $b$ enters the hole 15 of the fitting portion 1 of the window sash $a$, whereafter the actuating arm 4 is depressed and the fitting is locked.

If, when the ashes are connected after having been cleaned or the like, the actuating arm remains in open position, the latter is depressed automatically by the side of the sill $c$ when the window is closed and locks the fitting. This can be seen from Fig. 4, in which a window pivotally mounted on a horizontal axis has two fittings mounted on one sash each, the fitting portion with the actuating arm 4 being fixed to that sash, which, when the window is closed, is located remote from the window sill $c$ in the direction of turning of the window.

What I claim is:

1. A double detachable window sash and sill comprising a first window sash member, a second window sash member, a sill, and a latch comprising a first fixture for attachment to said first window sash, said first fixture including a fixed member having a hole therein, a locking plate slidably supported against said fixed member, said locking plate having a hole therein corresponding to the first said hole, a lever having an actuating arm and pivotally mounted on said fixed member and means coupling said lever to said locking plate to cause sliding movement of said locking plate in response to rotation of said lever, the actuating arm of said lever extending outwardly of the edge of said fixture when the two said holes in said fixture are in alignment and said arm being arranged to rotate to a position within the projection of the outline of said fixture; and a second fixture for attachment to said second window sash, said second fixture comprising a pin having a transverse groove therein, said pin being adapted to fit in the holes in said first fixture, said latch being placed in the edge of said double window sash to fasten said two sash members together with said arm extending from an edge of said first sash member in such a way that the closing of said sash will cause the window sill to depress the actuating arm of the latch thereby locking the window sash together.

2. A latch for locking double window sash together comprising a first fixture for attachment to a first window sash, said first fixture including a fixed member having a hole therein, a locking plate slidably supported against said fixed member, said locking plate having a hole therein corresponding to the first said hole, a lever having an actuating arm and pivotally mounted on said fixed member and means coupling said lever to said locking plate to cause sliding movement of said locking plate in response to rotation of said lever, said coupling means comprising a further arm extending at an angle to the actuating arm of said lever, a recess in said further arm and a projection on said locking plate engaging said recess the actuating arm of said lever extending outwardly of the edge of said fixture when the two said holes in said fixture are in alignment and said arm being arranged to rotate to a position within the projection of the outline of said fixture; and a second fixture for attachment to a second window sash, said second fixture comprising a pin having a transverse groove therein, said pin being adapted to fit in the holes in said first fixture, whereby said latch may be installed in the edge of double window sash to fasten two such sash together in such a way that the closing of said sash will cause the window sill to depress the actuating arm of the latch thereby locking the window sash together.

3. A latch as claimed in claim 2 further including stops for limiting the travel of said locking plate and wherein said locking plate is of resilient material having a bow therein urging the end of said plate having said projection toward the axis of said lever, whereby said lever is urged by the spring action of said plate to either of its extreme positions, thus tending to retain the lever in whichever of its extreme positions it is placed.

4. A latch for locking two members together comprising a first fixture for attachment to a first member, said first fixture including a fixed element having a hole therein, a locking plate slidably supported against said fixed element, said locking plate having a hole therein corresponding to the first said hole, a lever pivotally mounted on said fixed member and means coupling said lever to said locking plate to cause sliding movement of said locking plate in response to rotation of said lever, said coupling means comprising a further arm extending at right angles to said actuating arm, a recess in said further arm, a projection on said locking plate engaging said recess, and stops for limiting the travel of said locking plate, said locking plate being of resilient material having a bow therein urging the end of said plate having said projection toward the axis of said lever, whereby said lever is urged by the spring action of said plate to either of its extreme positions thus tending to retain the lever in whichever of its extreme positions it is placed; and a second fixture for attachment to a second member to be locked to said first member, said second fixture comprising a pin having a transverse groove therein, said pin being adapted to fit in the holes in said first fixture.

5. A latch for locking two members together comprising a first fixture for attachment to a first member, said first fixture including a fixed element having a hole therein, a locking plate slidably supported against said fixed element, said locking plate having a hole therein corresponding to the first said hole, a lever pivotally mounted on said fixed member, said lever having an actuating arm on one side of the lever axis and a further arm on the opposite side of the lever axis, means coupling said further arm to said locking plate to cause sliding movement of said locking plate in response to the rotation of said lever, said locking plate being of resilient material having a bow therein causing a portion of said plate to be urged against the further arm of said lever in the direction of the axis of said lever, whereby said lever is urged by the spring action of said plate to either of its extreme positions, thus tending to retain the lever in whichever of its extreme positions it is placed; and a second fixture for attachment to a second member to be locked to said first member, said second fixture comprising a pin having a transverse groove therein, said pin being adapted to fit in said holes in said first fixture.

References Cited in the file of this patent

UNITED STATES PATENTS

| | | |
|---|---|---|
| 1,259,397 | Hathaway | Mar. 12, 1918 |
| 1,434,325 | Brown | Oct. 31, 1922 |
| 2,592,956 | Saber | Apr. 15, 1952 |
| 2,749,165 | Coulter | June 5, 1956 |